March 2, 1943. H. ALLEN 2,312,787
SYSTEM OF GAUGING PRESSURE
Filed June 7, 1938 3 Sheets-Sheet 1

HERBERT ALLEN
INVENTOR.

BY Jesse R. Stone
Lester B. Clark
ATTORNEYS

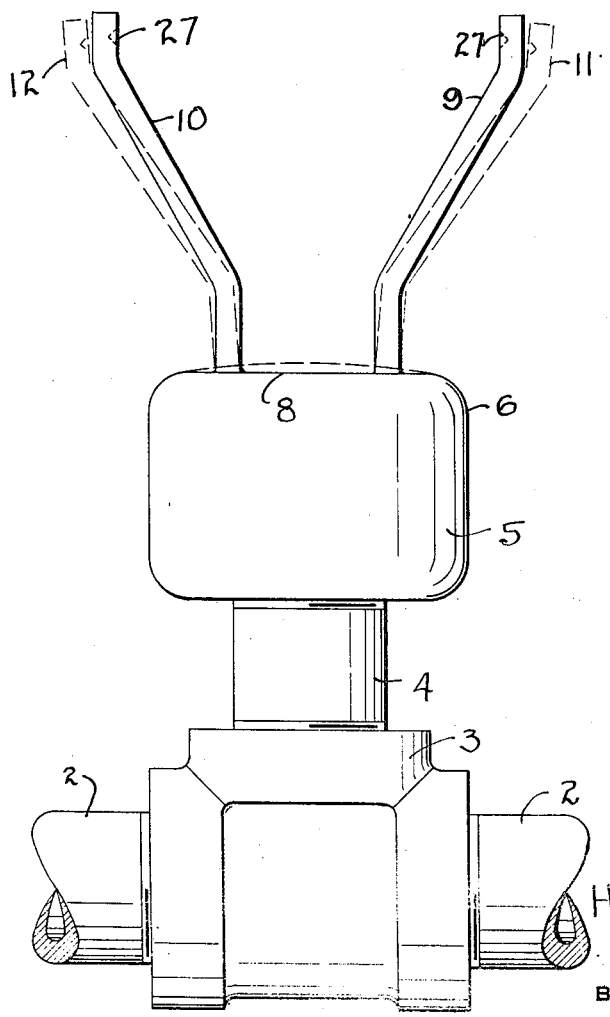

March 2, 1943.    H. ALLEN    2,312,787
SYSTEM OF GAUGING PRESSURE
Filed June 7, 1938    3 Sheets-Sheet 3

HERBERT ALLEN
INVENTOR
BY Jesse R. Stone
Lester B. Clark
ATTORNEYS.

Patented Mar. 2, 1943

2,312,787

UNITED STATES PATENT OFFICE 2,312,787

SYSTEM OF GAUGING PRESSURES

Herbert Allen, Houston, Tex., assignor to Abercrombie Pump Company, Houston, Tex., a corporation Application June 7, 1938, Serial No. 212,245

3 Claims. (Cl. 73—109)

The invention relates to a system of gauging pressures wherein an indicator member is insertable and removable with respect to the major portion of the pressure gauge so that when the gauge is attached to a container of pressure it will be impossible for an unauthorized or casual observer to determine the pressure.

It is one of the objects of the invention to provide a pressure gauge wherein a pressure responsive member is movable as a function of the applied pressure and wherein a gauge member may be applied to such pressure responsive member in order to obtain an indication of the applied pressure.

Another object of the invention is to attach a pressure responsive member to a source of fluid under pressure and to insert and remove an indicator member as desired in order to obtain a reading or indication of the pressure being exerted on such pressure member.

Still another object of the invention is to provide a pressure responsive member to which spaced arms are attached which will move relative to each other as a function of the pressure applied to said member and to also provide an indicator which may be inserted between such arms to determine the spacing thereof as an indication of the applied pressure.

Still another object of the invention is to provide a series of pressure responsive devices from which the pressure may not be casually observed and to additionally provide an indicator member which may be carried by the attendant and inserted at will in the pressure responsive devices so that only the attendant may ascertain the information as to the pressure existent on the device.

Other and further objects of the invention will be readily apparent when the following description is considered in connection with the accompanying drawings wherein:

Fig. 2 is a front elevation of the indicator member.

Fig. 3 is a side elevation of the pressure responsive device showing the manner of movement of the spaced arms when the device is subjected to pressure.

Figure 1:
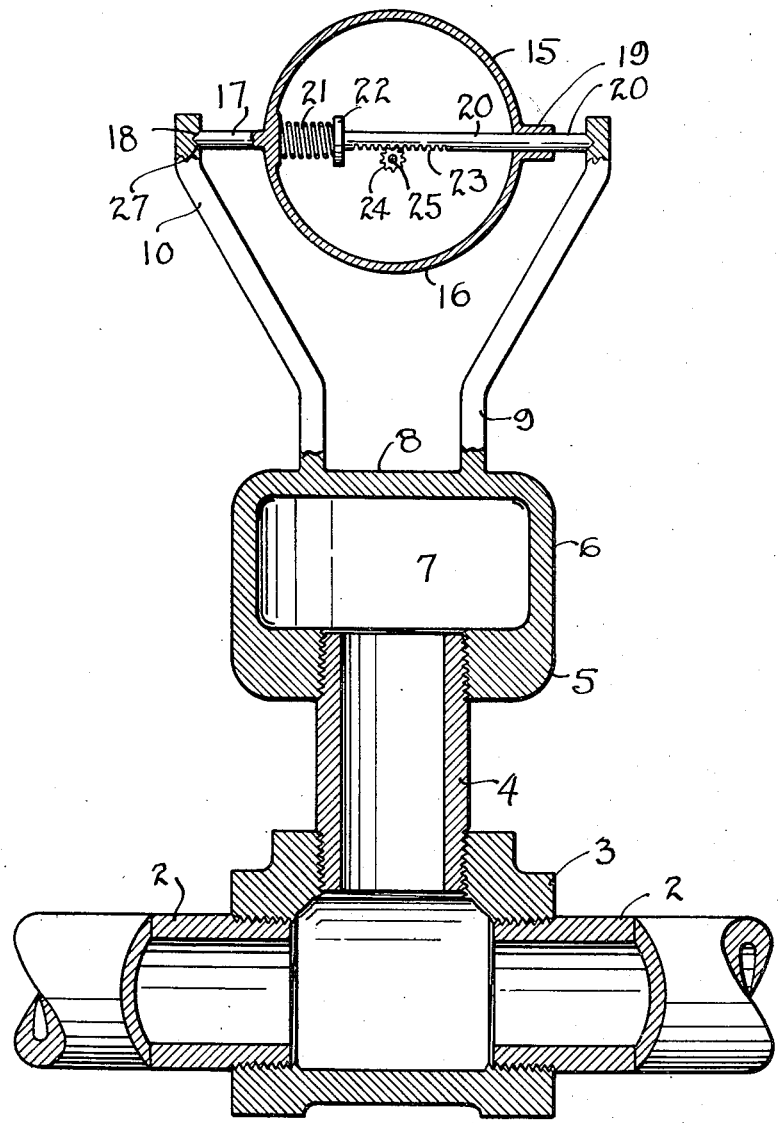
Fig. 1 is a vertical sectional view of the invention with the indicator in position to determine the applied pressure.

In Fig. 1 a pipe line or other container 2 is illustrated and it is intended that fluid under pressure will be confined in the container 2. A coupling 3 carries a nipple 4 which serves as a support for the pressure responsive device which is indicated generally at 5. This pressure responsive device includes the housing or body 6, which has a chamber 7 therein and to which chamber the nipple 4 provides an entry.

Fluid under pressure from the pipe 2 may enter the chamber 7 and will be effective against the top 8 of the body 6. The top 8 as seen in Fig. 1 is especially constructed so that it will be subject to movement as a function of the pressure applied in the chamber 7. Carried by this top 8 are the spaced arms 9 and 10, which are fixed to the top 8 and extend therefrom.

As seen in Fig. 3, when the pressure within the chamber 7 flexes the member 8 it will cause the arms 9 and 10 to move apart to assume the dotted line position illustrated at 11 and 12, respectively. The amount of movement is, of course, a function of the applied pressure so that the amount of spacing of the arms 9 and 10 may be measured as an indication of the applied pressure.

In order to measure the spacing of these arms at any desired period or time an indicator member 15 is provided and may be constructed as seen in Figs. 1 and 2. The casing 16 is arranged to carry a stationary stud 17, which may be pointed as at 18. The opposite side of the housing carries an extension 19 through which the pin or rod 20 is slidable. This rod, as seen in Fig. 1, is normally urged to an outward position by a spring 21 bearing against the head 22. A rack 23 on the side of the pin meshes with a pinion 24 which is fixed on a shaft 25 which carries the indicator hand or arm 26. The face of the gauge may be calibrated with any suitable indicia or marking 27'. In practice this indicator 16 will be carried by the attendant or the operator and as he approaches one of the pressure responsive devices 5, as seen in Fig. 3, it is only necessary for him to insert the indicator between the arms 9 and 10. The recessed portions 27 in each arm provide for an accurate placement of the indicator member. The pin 20 may be compressed to insert the indicator between the spaced arms but the spring 21 will extend the pin 20 so that it will accurately measure the distance between the arms. The measurement is indicated by the amount of movement of the hand or pointer 26. The indicia 27' may be calibrated in pounds or in any other suitable unit of measurement.

As soon as the attendant or operator has obtained his indication he may or may not record it as desired. The attendant will, however, remove the indicator after he has obtained his reading and the pressure responsive member will then appear as shown in Fig. 3 with no reading observable by an unauthorized person. Only the attendant will have knowledge as to the reading which was obtained.

From the foregoing it seems obvious that no casual or unauthorized person can obtain information as to the pressure being applied in the pipe line 2 and yet the readings can be taken accurately and as desired by an authorized attendant who is provided with an indicator such as 16. The indicator and the spacing of the arms will, of course, be calibrated as originally installed so that an accurate reading will be obtained.

The invention is particularly applicable to the pressure gauges applied to the well heads in an oil or gas field where the well pressures must be determined periodically in an accurate manner but yet where it is desired that the applied pressure be available only to authorized persons. One attendant may have an indicator which can be applied to a definite number of pressure responsive devices such as shown in Fig. 3 and by making his rounds he may use the same indicator to take the readings of a great number of pressure responsive devices.

Figure 4:
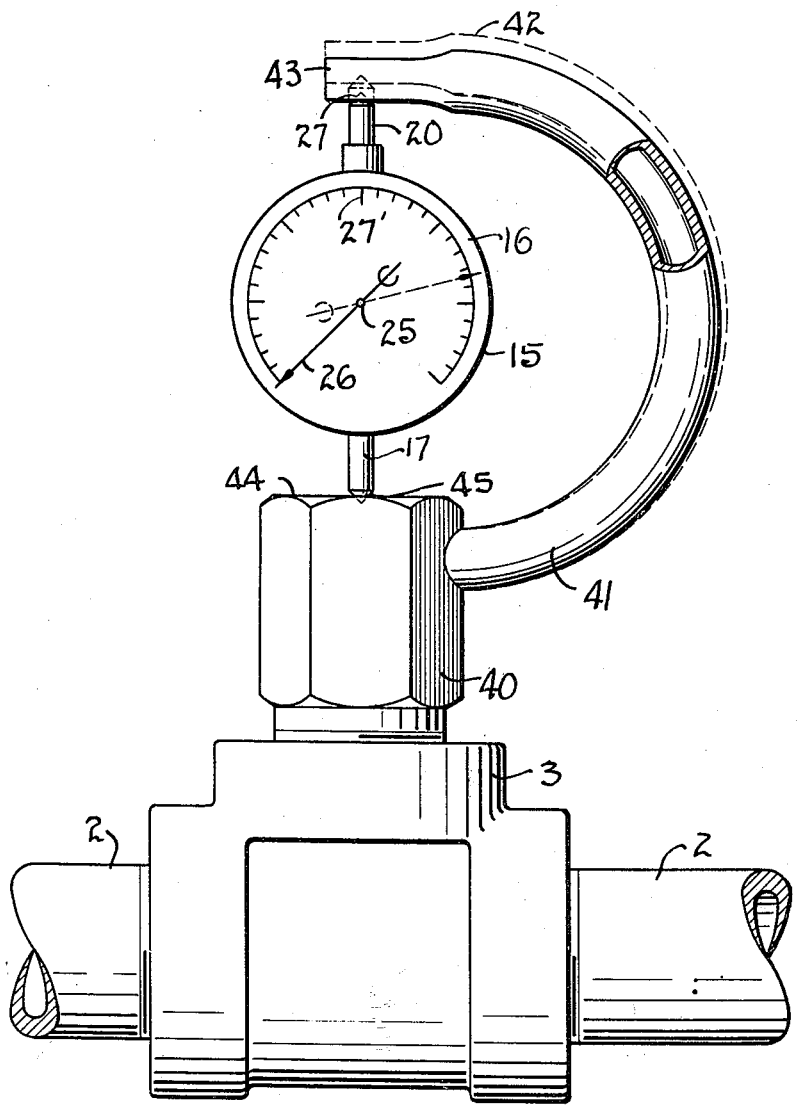
Fig. 4 shows a modified form of the invention embodying a pressure responsive tube.

Fig. 4 shows another form of the invention wherein the plug 40 is connected to the coupling 3 and this plug is hollow so as to permit the fluid under pressure to enter the hollow curved pressure tube 41. Such tubes are generally known as Bourdon tubes and are made of a relatively flexible material which is subject to movement when pressure is applied. Naturally the pressure tends to straighten out the tube 41 and, as indicated in the dotted line in Fig. 2, the pressure will move the end 43 of the tube away from the face 44 of the plug 40. A socket 45 is provided in the plug 40 to receive either the stud 17 or the pin 20 so that the indicator 16 may be inserted in the device to determine the applied pressure. The operation of this form of the invention is the same as that described in Figs. 1 to 3, inclusive. Broadly the invention contemplates a system of pressure gauges wherein the pressure indicator is readily insertable and removable with respect to the pressure responsive device.

What is claimed is:

1. A system of gauging pressure along a conduit comprising a series of pressure responsive elements connected to said conduit at spaced intervals, said pressure responsive elements each comprising a post having a passage in communication with said conduit, a curved tube connected to said post in communication with said passage and curved so the free end is opposite to said post, and a removable distance measuring gauge having relative extensible and retractable parts inserted between the free end of one of the tubes and a fixed point on the post for measuring the amount of deflection of the tube as an index of the pressure to which the tube is responsive.

2. A pressure gauge comprising a post having a passage therein for communication with a source of pressure, a substantially curved hollow tube connected at one end to said post in communication with said passage and having a portion opposite said post, a removable distance measuring gauge having relative extensible and retractable parts inserted between the portion of said tube and a fixed point on said post for measuring the amount of flexing of the hollow tube as an index of the pressure to which the tube is responsive.

3. A pressure gauge comprising a tubular post adapted to be readily connected into a pressure line, a chamber in communication with said post having a portion adapted to be flexed in response to applied pressure, said post-chamber structure having two spaced parts movable relative to each other in response to the flexure of the chamber portion, said parts being adapted to have a distance measuring gauge removably inserted therebetween to measure the distance between said parts as an index of applied pressure.

HERBERT ALLEN.